United States Patent
Yarvis et al.

(10) Patent No.: US 7,596,152 B2
(45) Date of Patent: *Sep. 29, 2009

(54) APPARATUS, SYSTEM AND METHOD CAPABLE OF LOW DUTY CYCLE HIERARCHICAL AD HOC NETWORKS

(75) Inventors: Mark Yarvis, Portland, OR (US); Jasmeet Chhabra, Hillsboro, OR (US); Nandakishore Kushalnagar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 789 days.

This patent is subject to a terminal disclaimer.

(21) Appl. No.: 11/006,843

(22) Filed: Dec. 7, 2004

(65) Prior Publication Data

US 2006/0120303 A1 Jun. 8, 2006

(51) Int. Cl.
*H04J 3/06* (2006.01)
*H04W 4/00* (2009.01)
*H04L 12/28* (2006.01)

(52) U.S. Cl. .................. 370/503; 370/351; 370/338
(58) Field of Classification Search .............. 370/335, 370/310, 311, 312, 324, 328, 408, 350, 351, 370/465, 321, 329, 331; 455/41.2, 41.7, 455/450, 452.1, 553.1, 556.2; 340/539.22, 340/539.11
See application file for complete search history.

(56) References Cited

U.S. PATENT DOCUMENTS

| | | | | |
|---|---|---|---|---|
| 6,456,599 | B1 * | 9/2002 | Elliott | 370/254 |
| 7,171,476 | B2 * | 1/2007 | Maeda et al. | 709/227 |
| 7,242,294 | B2 * | 7/2007 | Warrior et al. | 340/539.22 |
| 7,266,085 | B2 * | 9/2007 | Stine | 370/252 |
| 7,298,716 | B2 * | 11/2007 | Abraham et al. | 370/321 |

* cited by examiner

*Primary Examiner*—Hanh Nguyen
(74) *Attorney, Agent, or Firm*—James S. Finn N

(57) ABSTRACT

An embodiment of the present invention provides an apparatus, comprising a transceiver capable of dynamic cluster-based sleep/wake scheduling using hierarchical routing, cluster formation, and sleep-wake synchronization. The hierarchical routing may comprise a sink node capable of sending periodic route updates, which may propagate through a network to regular nodes and the route updates may include metrics allowing the regular nodes to select a "best" path to the sink node. The metrics may include hop count or end-to-end reliability and the regular node may track a next hop which optimizes the metric; and packets originating or forwarded by the regular node to the sink node may be sent to the next hop. Further, the route updates may propagate across a backbone network to cluster heads.

28 Claims, 5 Drawing Sheets

APPARATUS, SYSTEM AND METHOD CAPABLE OF LOW DUTY CYCLE HIERARCHICAL AD HOC NETWORKS

BACKGROUND

Wireless communications has become prevalent throughout society creating the need for faster, more reliable and less power consuming wireless communication techniques. Included in wireless networks are networks such as, but not limited to, sensor networks. In networks such as sensor networks, network lifetime may be problematic in battery-powered sensor networks. Existing techniques that allow nodes of a network to sleep and still communicate with neighbors utilize fine-grained packet-level synchronization. However, these previous approaches are primarily MAC-oriented and thus sleep and wake on a per-packet basis. This fine grained approach has yet to achieve a duty cycle significantly lower then 10%.

Thus, a strong need exists for a system, apparatus and method capable of improved wireless network lifetime.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
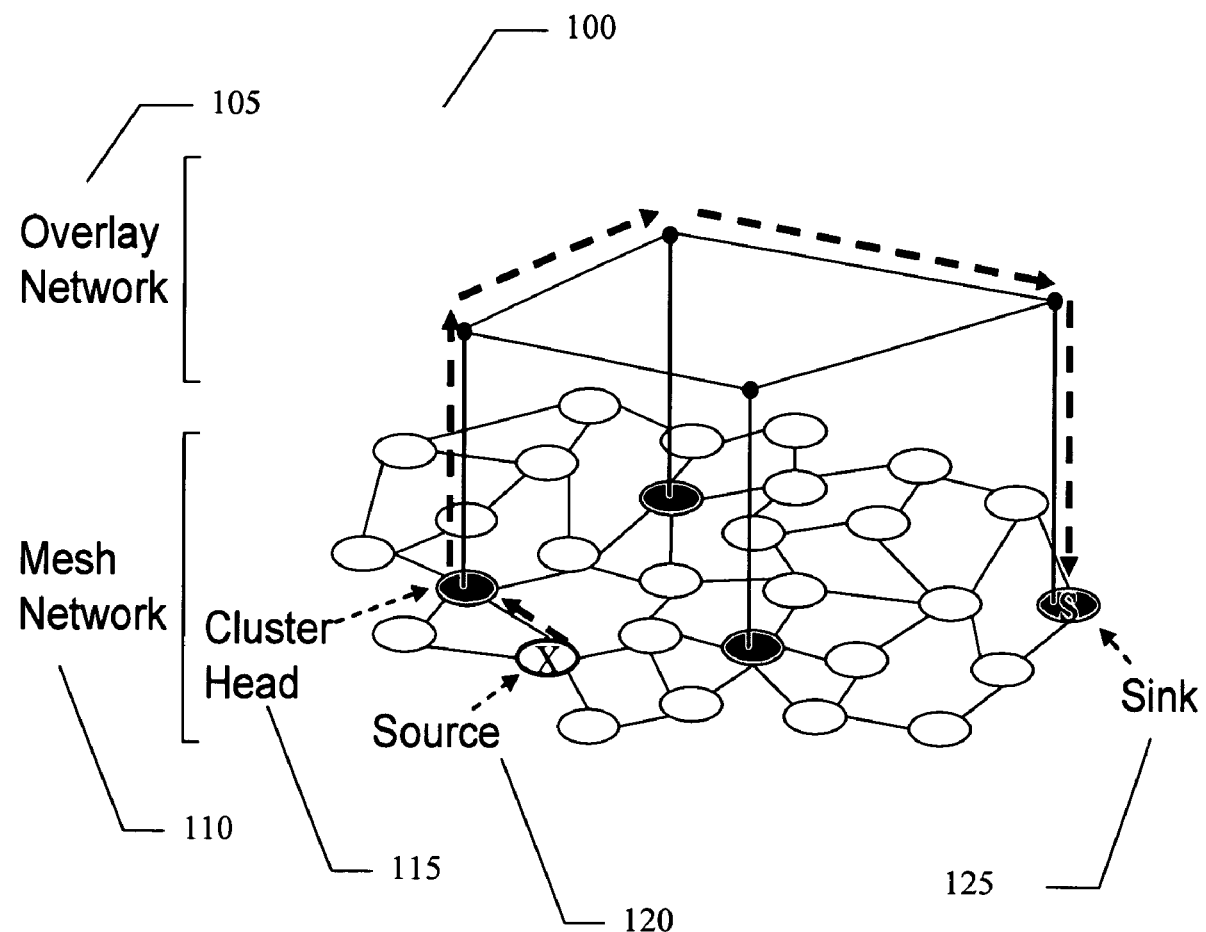
FIG. 1 illustrates hierarchical routing from source X to sink S of an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause an effect relationship).

It should be understood that embodiments of the present invention may be used in a variety of applications. Although the present invention is not limited in this respect, the devices disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's), wireless local area networks (WLAN), personal area networks (PAN, and the like) and sensor networks.

Network lifetime is a key problem in battery-powered sensor networks. Since many sensor networks have long periods without data traffic, it may make sense for nodes to sleep periodically. For example and not by way of limitation, in a preventative-maintenance equipment monitoring application, the health of each piece of equipment may only need to be checked on a weekly basis. Existing techniques that allow nodes to sleep and still communicate with neighbors utilize fine-grained packet-level synchronization. An alternative approach may be to use large-grained synchronization in which clusters of nodes synchronize their sleep periods and utilize relatively large wake and sleep periods. An embodiment of the present invention may combine route selection with course-grained, application-level synchronized sleep/wake, dynamically defining clusters of nodes that sleep and wake together. Because this approach allows a very long sleep period with very low synchronization overhead, the increase in network lifetime may be much greater than previous approaches.

An embodiment of the present invention may be designed to enhance battery-powered wireless networks that (1) have very sparse communication patterns, (2) employ one-to-many or many-to-one communication, (3) utilize an ad hoc wireless topology, and (4) include several points of exit to a backbone network; although the present invention is not limited in this respect or to these examples. Networks with these characteristics are commonly used for building automation or to monitor or control industrial equipment, but many other possibilities exist and it is understood these are just exemplified embodiments of the present invention. The present invention allows such networks to operate at extremely low duty cycles (<1%); much lower than previously possible.

A typical network, although not limited in this respect, consists of three types of nodes: regular nodes, sinks, and cluster heads. Regular nodes may be power constrained (typically battery powered) and may use short-range radios to form an ad hoc mesh network. Sink nodes are the focus of many-to-one and one-to-many communication with the regular nodes. Although an illustrative embodiment of the present invention uses networks with one sink, these techniques apply equally to networks with multiple sinks. Finally, cluster heads are less energy constrained (typically line powered) and have an additional network interface to a long-range backbone network, over which cluster heads may communicate with one another. For example and not by way of limitation, in a network of 802.11 links, the backbone might consist of Ethernet or 802.16 links. In a sensor network that uses low-power radios for communication, an 802.11 backbone might be appropriate. The cluster heads may provide a "highway on-ramp" allowing packets to flow quickly and efficiently across the backbone network, bypassing the "local streets" of the mesh network. Note that the sink node may typically have an interface to the backbone network, although the present invention is not limited in this respect.

An embodiment of the present invention may consist of three elements: hierarchical routing, cluster formation, and sleep-wake synchronization. In an embodiment of the present invention and not limited in this respect, the Hierarchical Routing may use a proactive distance-vector-based routing algorithm to route packets from the regular nodes to each sink node (again, other algorithms may be used in the present invention for packet routing). Each sink node may send periodic route updates, which may propagate through the network. In an embodiment of the present invention, route updates may include metrics, such as hop count or end-to-end reliability, allowing nodes to select the "best" path to the sink. Each node may track the "next hop" that optimizes the metric. Packets originating or forwarded by this node to a given sink may be sent to this next hop.

As illustrated generally at 100 of FIG. 1, route updates may also propagate across the backbone network to cluster heads 115. Cluster heads 115 that are far from the sink node 125 will likely be able to advertise a favorable metric in their route update, attracting neighbors to establish routes through this cluster head 115. Thus, nodes 120 in the neighborhood of a cluster head (even those multiple hops away) tend to forward packets through that cluster head.

Routing in the backbone network (also referred to herein as overlay network 105) may be integrated with the underlying mesh 110, or it can be independent. To allow independent routing, packets from the underlying network 110 may be encapsulated as they flow over the backbone 105—although they are not required to be.

While the above embodiment assumes a proactive distance-vector protocol, it is understood that the techniques described may be equally be applied to other types of ad hoc routing protocols.

Figure 2:
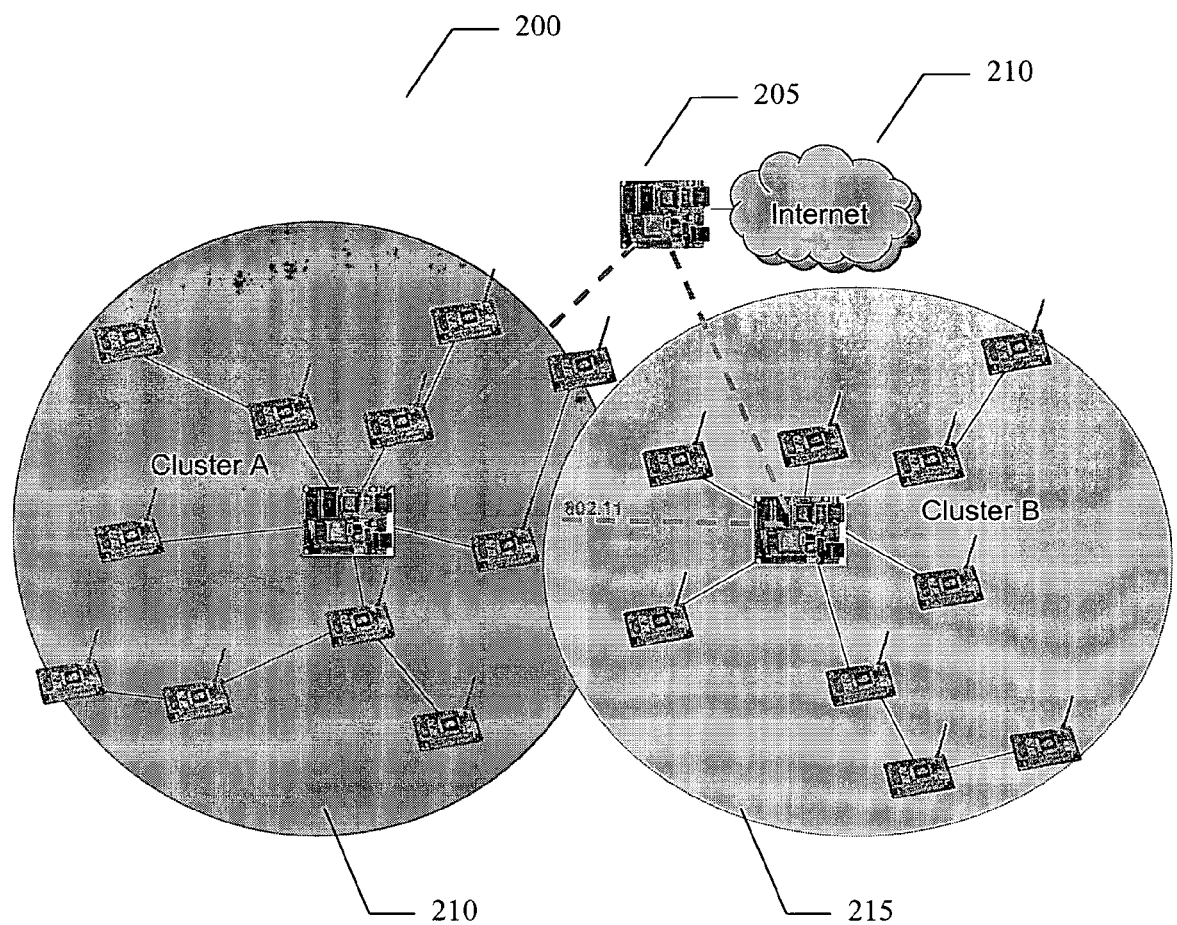
FIG. 2 depicts clustering of nodes around cluster heads based on chosen routes of an embodiment of the present invention.

The aforementioned routing mechanism inherently forms clusters of nodes around the cluster heads 115 (the "on-ramps" to the backbone network). Each cluster may contain a set of nodes that have all chosen to deliver data to the sink through the same cluster head 115. The routing protocol may allow each node to select a cluster that provides the optimal path of data delivery to the sink 125 (as defined by the routing metric). An embodiment of the present invention provides that the clusters (for example cluster A, 210 and cluster B, 215 of FIG. 2) may be formed by routing to coordinate sleep/wake schedules. To make this possible, a node (such as source node 120) must know the identity of the cluster to which it belongs. Thus, an embodiment of the present invention adds to the route update generated by the routing protocol a field that specifies the cluster head through which the route update flows. When a route update is received by the cluster head, said cluster head may record its address in this field before forwarding route updates to said cluster head's neighbors. When a route update is received by a regular node, said regular node identifies the best route to the sink using the distance-vector protocol—again, this protocol is but one of many that may be utilized by the present invention. Along with the next hop and metric associated with the best route, the node records the cluster head's address. Each cluster may be uniquely identified by the cluster head's address. FIG. 2, generally at 200, further illustrates a backbone network connecting cluster A 210 and Cluster B 215 with sink node 205, which may share data collected from the network with nodes on the Internet 210.

It is understood that while the above clustering protocol has low cost and ensures that nodes may efficiently route packets to the cluster head, other clustering schemes may also support the herein articulated sleep/wake protocol.

In an embodiment of the present invention, all nodes in a cluster may sleep and wake together. This approach ensures that any node wishing to send data to the sink may send packets over one or more hops to the cluster head without the latency or buffering required when a node along the path is asleep.

Figure 3:
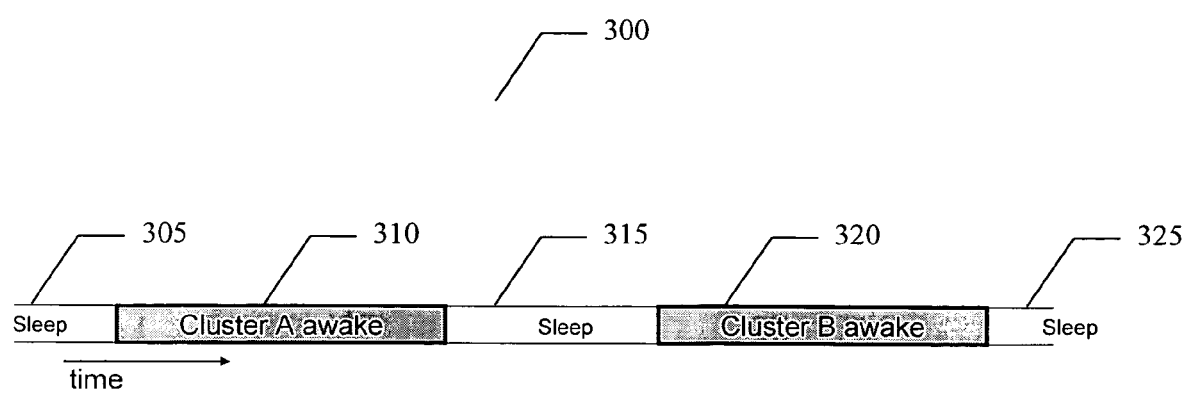
FIG. 3 illustrates the timing of sleep wake cycles of an embodiment of the present invention.

Turning now to FIG. 3, illustrated generally at 300, each cluster's sleep/wake cycle is controlled by the cluster head of that cluster. Typically, the sleep period 305, 315 and 325 may be much longer than the wake period. Cluster wake periods (such as cluster A wake period 310 and cluster B wake period 320) may be independent, and may overlap; although the present invention is not limited in this respect.

Figure 4:
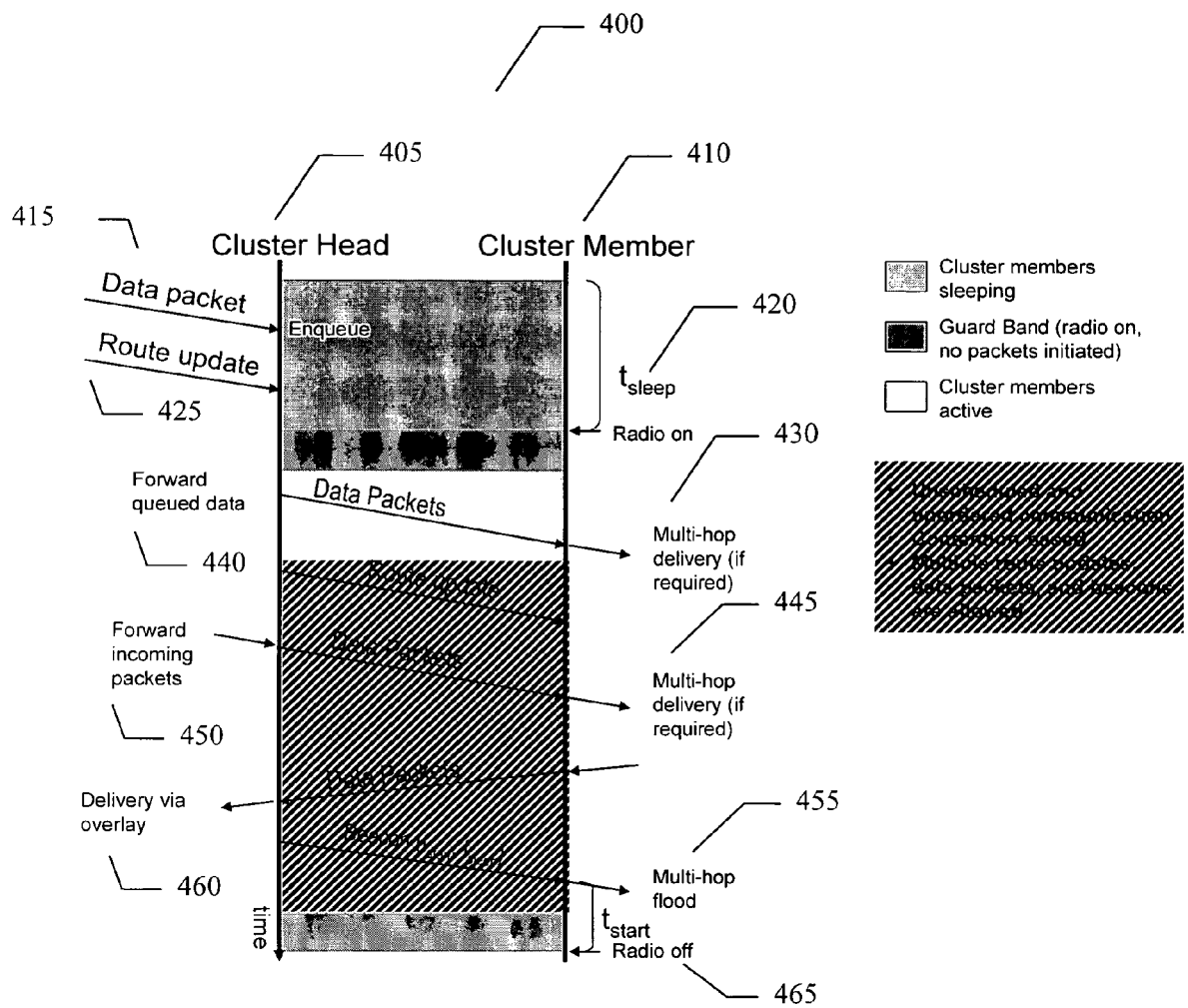
FIG. 4 shows cluster sleep/wake coordination protocol of an embodiment of the present invention.

Turning now to FIG. 4, shown generally as 400, details of the cluster sleep/wake coordination protocol are further illustrated. When the cluster is asleep, the cluster head 405 queues data packets (including route updates) destined for cluster member 410 nodes in the cluster. Cluster nodes 410 may all wake at a predetermined time specified by the cluster head 405 in the previous wake cycle. During the $t_{sleep}$ time period 420 data packet 415 and route update 425 are queued at cluster head 405. When cluster members become active, cluster head 405 forwards queued data 440 to cluster member 410 via multi-hop delivery 430 (if required). Route updates, forwarding of incoming packets 450 (data packets via multi-hop delivery 445 if required), return of data packets from cluster member 410 to cluster head 405 for delivery via overlay 460, and beacon ($t_{start}$, $t_{sleep}$) transmissions via multi-hop floods may all be accomplished via contention based, unscheduled and unordered communication; although the present invention is not limited in this respect. Multiple route updates, data packets and beacons are allowed.

Although the present invention is not limited in this respect, the wake period may be divided into four parts:

A guard band at the start of the wake period may be provided to handle loss of synchronization between nodes. During the guard band, nodes may listen for neighbor transmissions but do not originate or forward any packets. The length of the guard band may be determined by the distribution latency of cluster sleep commands from the cluster head and the maximum clock drift that can occur while nodes are sleeping.

After the guard band, the cluster head may forward packets that were queued for the cluster members during the sleep period. The length of this period may be fixed, or the cluster head may send a message to indicate the end of this period.

The largest part of the wake period may be, although is not required to be, the active communication phase. During this phase, individual nodes may freely send packets to the sink node. In addition, the cluster head may forward packets to nodes from the sink, including the current route update message, which may propagate through the cluster. Finally, the cluster head may send a synchronization beacon periodically during this phase. The synchronization beacon is described below, but it is understood that the present invention is not limited to this synchronization beacon.

At the end of the wake period may be a second guard band. Once again, nodes receive packets and forward packets toward the cluster head, but they do not originate packets.

Cluster members may learn when to sleep and wake when they receive a cluster synchronization beacon from the cluster head during the cluster wake period. Because the cluster members know the identity of their cluster head, they may differentiate cluster synchronization beacons that they might receive from other clusters (if their wake periods overlap). The cluster synchronization beacon specifies $t_{start}$, the time remaining until the cluster should start sleeping, and $t_{sleep}$, the amount of time the cluster will sleep. The cluster head may send more than one synchronization beacon during the wake period either to ensure that all nodes receive the beacon, or to revise (either extending or reducing) the wake period.

Figure 5:
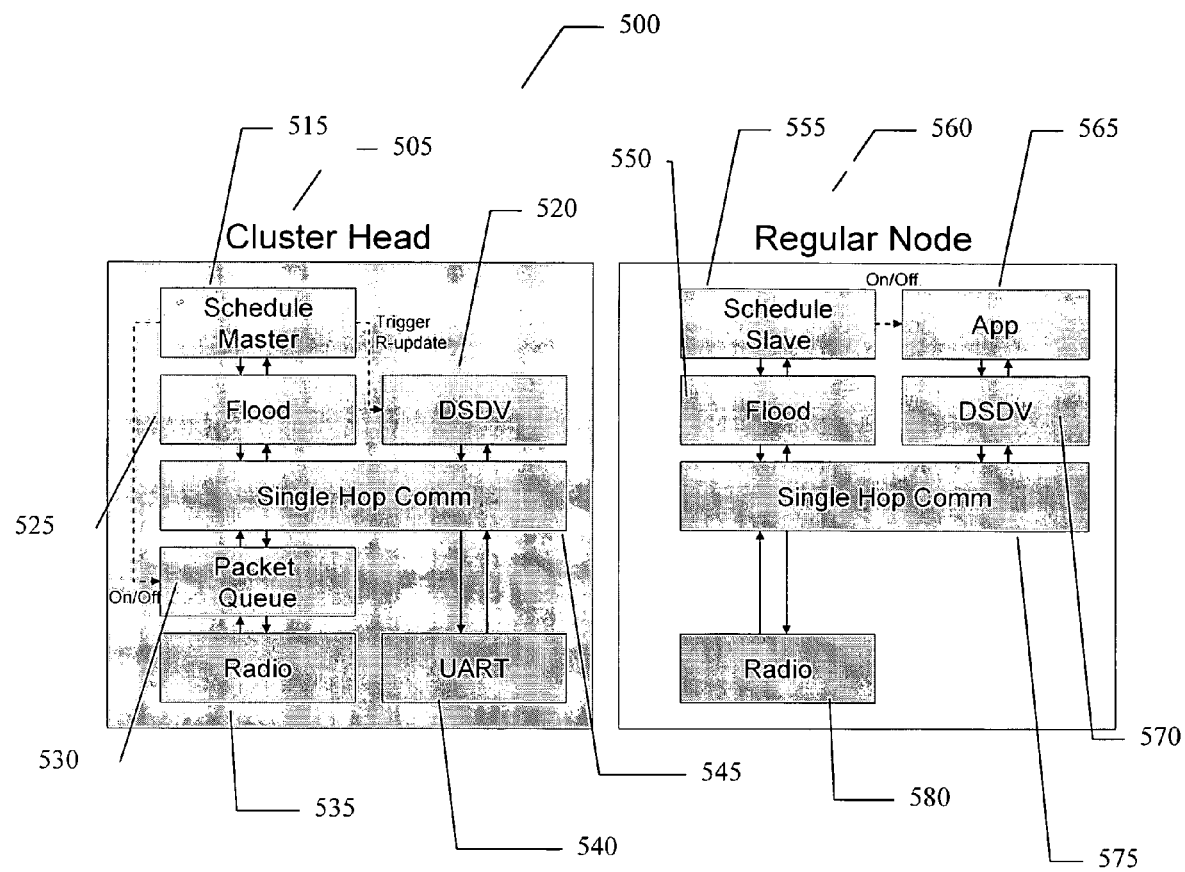
FIG. 5 illustrates node architecture of an embodiment of the present invention.

The cluster sleep wake protocol may be implemented in the cluster head and the regular nodes. No modification is required on the sink node, unless it is also a cluster head. As shown in FIG. 5, generally as 500, the ScheduleMaster module 515 may implement the cluster head part of the sleep wake protocol. While in the sleep mode, the ScheduleMaster module 515 may send on "on" signal to the PacketQueue 530. As a result, the PacketQueue 530 may queue any packets received for transmission from the SingleHopComm module 545, and the Radio module 535 will be powered off. During this time, packets from the overlay network may be received via a secondary communication interface, in this embodiment, but not limited to, the UART module 540. Such packets may be processed by the SingleHopComm module 545, processed by the routing layer (in this example, but not limited to, the DSDV module 520) and forwarded back through the SingleHopComm module 545 to the PacketQueue module 530, where they will be queued. At some point in the future, the ScheduleMaster module 515 may switch to the waking mode. At the start of the waking mode, the ScheduleMaster module 515 may send an "off" singal to the PacketQueue 530, causing the radio module 535 to be turned on and queued packets to be sent through the radio module. Next the ScheduleMaster module 515 may signal the routing layer (in this example, but not limited to, the DSDV module 520) to send route updates to identify new routes. In this mode, packets received from the sensor network by the Radio module 535 may traverse the PacketQueue 530, to the SingleHopComm module 545, to the DSDV module 520, back through the SingleHopComm module 545, and to the overlay network via the UART module 540. Packets received from the overlay network may take the reverse path, eventually being delivered to the sensor network via the Radio module 535. In addition, the ScheduleMaster module 515 may generate beacon packets and deliver them to the sensor network via the Flood module 525. At an appropriate time, the ScheduleMaster may switch back to sleep mode, as described above.

As shown in FIG. 5, generally as 500, the ScheduleSlave module 555 may implement the regular node part of the sleep wake protocol. While it is in the awake mode, it may periodically receive beacon packets from the sensor network through the Radio module 580, SingleHopComm module 575, and the Flood module 550 (again, it is understood that any particular module types articulated herein are for illustrative purposes only and the present invention is not limited to these specific modules). Other packets may be sent to and from the sensor network by the Application (App) module 565 through a routing layer (in this example, but not limited to, the DSDV module 570), the SingleHopComm module 575, and the Radio module 580. At some point, the ScheduleSlave module 555 may switch to sleep mode, in accordance with received beacons, and signal the App layer to go to sleep. The App layer may cease generating packets.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An apparatus, comprising:
   a transceiver capable of dynamic cluster-based sleep/wake scheduling using hierarchical routing, cluster formation, and sleep-wake synchronization;
   wherein said hierarchical muting comprises a sink node capable of sending periodic route updates, which propagate through a network to regular nodes;
   wherein said cluster formation comprises a set of nodes that deliver data to said sink node through the same cluster head with a routing protocol which allows each node to select a cluster that provides the optimal path of data delivery to said sink node according to a routing metric;
   wherein said clusters formed by routing are utilized to coordinate sleep/wake schedules and a node knows the identity of said cluster to which it belongs;
   wherein a field that specifies the cluster head through which the route update flows is added to the route update generated by the routing protocol and when a route update is received by the cluster head, said cluster head records said cluster head's address in this field before forwarding route updates to said cluster head's neighbors; and
   wherein when a route update is received by a regular node that identifies the best route to said sink node using a distance-vector protocol, the node records the cluster head's address with each cluster being uniquely identified by the cluster head's address along with the next hop and metric associated with the best route.

2. The apparatus of claim 1, wherein said route updates include metrics allowing said regular nodes to select a best path to said sink node.

3. The apparatus of claim 2, wherein said metrics include hop count or end-to-end reliability.

4. The apparatus of claim 2, wherein said regular node tracks a next hop which optimizes said metric and packets originating or forwarded by said regular node to said sink node be sent to said next hop.

5. The apparatus of claim 1, wherein said route updates propagate across a backbone network to cluster heads.

6. The apparatus of claim 5, wherein said cluster heads that are far from said sink node advertise a favorable metric in route update thereby attracting neighbors to establish routes through said cluster head.

7. The apparatus of claim 5, wherein said routing in the backbone network is integrated with an underlying mesh network or independent.

8. The apparatus of claim 7, wherein packets from said underlying mesh network are encapsulated as flow over said backbone.

9. The apparatus of claim 1, wherein all nodes in said cluster formation sleep and wake together thereby enabling any node wishing to send data to said sink to send packets over one or more hops to said cluster head without latency or buffering required when a node along the path is asleep.

10. The apparatus of claim 1, wherein said cluster formation's sleep/wake cycle is controlled by a cluster head of said cluster formation.

11. The apparatus of claim 10, wherein cluster wake periods are independent and overlap.

12. The apparatus of claim 1, wherein when said cluster formation is asleep, cluster heads queue data packets destined for nodes in the cluster.

13. The apparatus of claim 12, wherein the wake period is divided into:
   a guard band at the start of the wake period;
   cluster head forwarding of packets that were queued for the cluster members during the sleep period;
   an the active communication phase; and
   a synchronization phase where said cluster heads send a synchronization beacon periodically.

14. The apparatus of claim 13, wherein said cluster head sends more than one synchronization beacons during the wake period either to ensure that all nodes receive the beacon, or to revise the wake period.

15. A method of lowering the duty cycle of hierarchical ad hoc networks, comprising:
   using hierarchical routing, cluster formation, and sleep-wake synchronization to provide dynamic cluster-based sleep/wake scheduling;
   using a sink node capable of sending periodic route updates in said hierarchical routing to provide for propagation through a network to regular nodes;
   delivering data to said sink node by a set of nodes within said cluster formation through the same cluster head with a routing protocol which allows each node to select a cluster that provides the optimal path of data delivery to said sink node according to a routing metric;
   utilizing said clusters formed by routing to coordinate sleep/wake schedules and to enable a node to know the identity of said cluster to which it belongs; and
   adding to the route update generated by the routing protocol a field that specifies the cluster head through which the route update flows and when a route update is received by the cluster head, recording said cluster head's address in this field before forwarding the route updates to said cluster head's neighbors; and
   receiving a route update by a regular node and identifying the best route to said sink node by using a distance-vector protocol and along with the next hop and metric associated with the best route, recording by said node the cluster head's address with each cluster being uniquely identified by the cluster head's address.

16. The apparatus of claim 15, further comprising allowing said regular nodes to select a "best" path to said sink node by using route updates which include metrics.

17. The method of claim 16, further comprising using metrics that include hop count or end-to-end reliability.

18. The method of claim 16, further comprising tracking a next hop by said regular node which optimizes said metric and provides packets originating or forwarded by said regular node to said sink node to be sent to said next hop.

19. The method of claim 15, further comprising propagating said route updates across a backbone network to cluster heads.

20. The method of claim 19, further comprising advertising a favorable metric in route update by said regular node to said cluster beads that are far from said sink node thereby attracting neighbors to establish routes though said cluster head.

21. The method of claim 19, further comprising integrating said routing in the backbone network with an underlying mesh network.

22. The method of claim 21, further comprising encapsulating packets from said underlying mesh network as flow over said backbone.

23. The method of claim 15, enabling any node wishing to send data to said sink to send packets over one or more hops to said cluster head without latency or buffering when a node along the path is asleep by requiring all nodes in said cluster formation to sleep and wake together.

24. The method of claim 15, further comprising controlling by a cluster head of said cluster formation said cluster formation's sleep/wake cycle.

25. The method of claim 24, further comprising allowing said cluster wake periods to be independent and to overlap.

26. The method of claim 15, further comprising, queuing, by said cluster heads, data packets destined for nodes in the cluster when said cluster formation is asleep.

27. The method of claim 26, further comprising dividing the wake period into:

a guard band at the start of the wake period;

cluster head forwarding of packets that were queued for the cluster members during the sleep period;

an active communication phase;

and a synchronization phase where said cluster heads send a synchronization beacon periodically.

28. The method of claim 27, further comprising sending, by said cluster head, more than one synchronization beacon during the wake period either to ensure that all nodes receive the beacon, or to revise the wake period.

* * * * *

UNITED STATES PATENT AND TRADEMARK OFFICE
CERTIFICATE OF CORRECTION

PATENT NO. : 7,596,152 B2  Page 1 of 1
APPLICATION NO. : 11/006843
DATED : September 29, 2009
INVENTOR(S) : Yarvis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1266 days.

Signed and Sealed this

Twenty-eighth Day of September, 2010

David J. Kappos
*Director of the United States Patent and Trademark Office*